(12) United States Patent
Chen

(10) Patent No.: US 10,198,679 B2
(45) Date of Patent: Feb. 5, 2019

(54) NFC CARD EMULATION DEVICE

(71) Applicant: SHENZHEN EXCELSECU DATA TECHNOLOGY CO., LTD., Shenzhen, Guangdong (CN)

(72) Inventor: Liuzhang Chen, Guangdong (CN)

(73) Assignee: SHENZHEN EXCELSECU DATA TECHNOLOGY CO., LTD., Shenzhen, Guangdong (CN)

(*) Notice: Subject to any disclaimer, the term of this patent is extended or adjusted under 35 U.S.C. 154(b) by 0 days.

(21) Appl. No.: 15/746,644

(22) PCT Filed: Dec. 8, 2015

(86) PCT No.: PCT/CN2015/096656
§ 371 (c)(1),
(2) Date: Jan. 22, 2018

(87) PCT Pub. No.: WO2017/012247
PCT Pub. Date: Jan. 26, 2017

(65) Prior Publication Data
US 2018/0211145 A1    Jul. 26, 2018

(30) Foreign Application Priority Data

Jul. 22, 2015 (CN) .................... 2015 2 0537451 U

(51) Int. Cl.
G06K 19/06 (2006.01)
G06K 19/07 (2006.01)
G06K 19/077 (2006.01)

(52) U.S. Cl.
CPC ....... *G06K 19/0723* (2013.01); *G06K 19/077* (2013.01)

(58) Field of Classification Search
CPC ............... G06Q 20/341; G06Q 20/385; G06K 19/06206; G06K 19/0723; G06K 19/07; G06K 19/07703; G06K 19/07749
(Continued)

(56) References Cited

U.S. PATENT DOCUMENTS

2004/0246149 A1   12/2004  Fedigan
2014/0263624 A1*  9/2014   Guillaud .................. G06K 5/00
                                                     235/380

FOREIGN PATENT DOCUMENTS

| CN | 202257621 | 5/2012 |
| CN | 103676728 | 3/2014 |
| CN | 204463130 | 7/2015 |

OTHER PUBLICATIONS

Written Opinion and International Search Report for International application No. PCT/CN2015/096656, dated Apr. 25, 2016; 9 pages (English and Chinese).

* cited by examiner

*Primary Examiner* — Jamara Franklin
(74) *Attorney, Agent, or Firm* — Rankin, Hill & Clark LLP

(57) ABSTRACT

An NFC card emulation device including a button press confirmation circuit, a time-out determination unit, and a control circuit. The time-out determination unit is formed by adopting discrete components, such as, the second diode, the second resistor, the first resistor and the first capacitor, etc. When the NFC card emulation device approaches the card reader, the card reader supplies energy to the NFC card emulation device and charges the first capacitor by the control circuit, and when the NFC card emulation device is removed from the card reader, the control circuit realizes the timing function by the first capacitor; if, within the timing period, it is determined that the button press confirmation (Continued)

has been performed, it is determined that the button press confirmation is valid. Such a time-out determination unit has a simple structure and a low cost.

8 Claims, 3 Drawing Sheets

(58) Field of Classification Search
USPC .......................................................... 235/492
See application file for complete search history.

NFC CARD EMULATION DEVICE

TECHNICAL FIELD

The present application relates to the technical field of telecommunication devices, and more particularly to an NFC card emulation device.

BACKGROUND

Near field communication (NFC) is a kind of short-range high-frequency radio communication, which operates at a frequency of 13.56 MHz within a distance of 20 cm and whose transmission speed is 106 Kbit/s, 212 Kbit/s, or 424 Kbit/s. At present, the NFC has established an ISO/IEC IS 18092 international standard, an ECMA-340 standard, and an ETSI TS 102 190 standard. The NFC adopts positive and passive reading modes.

An NFC card emulation device adopts a device to emulate the NFC card, information related to the card is stored in a memory of the device, such that related card applications, such as transportation cards and bankcards, can be realized.

On the NFC card emulation device, after the information interaction between the card reader and the card emulation device, the card emulation device requires to perform button press confirmation, if the button press confirmation is performed within a certain period after the card reader is removed from the card emulation device, the button press confirmation is valid; and if the button press is not performed within the certain period after the card reader is removed from the card emulation device, the button press on the NFC card emulation device is invalid.

The existing NFC card emulation device is equipped with a timer to achieve the above determination, however, the timer is complicate in structure and high in cost.

SUMMARY

It is an object of the present application to provide an NFC card emulation device, which aims at solving the problems that the existing timer has a complicate structure and a high production cost.

The present application is realized as follows: an NFC card emulation device, the NFC card emulation device comprises:

a button press confirmation circuit configured to perform button press confirmation;

a time-out determination unit configured for timing; and a control circuit which is respectively connected with the button press confirmation circuit and the time-out determination unit and configured to determine whether the button press confirmation is performed within a timing period after the NFC card emulation device is removed from a card reader;

the time-out determination unit comprises: a first unidirectional conducting tube, a second resistor, a first resistor, and a first capacitor; and a first end of the first unidirectional conducting tube is connected with the control circuit, a second end of the first unidirectional conducting tube is grounded via the first resistor and the first capacitor which are connected in parallel, and the second resistor and the first unidirectional conducting tube are connected in parallel.

In the aforementioned structure, the first unidirectional conducting tube adopts a second diode, an anode of the second diode is connected with the control circuit, and a cathode of the second diode is grounded via the first resistor and the first capacitor which are connected in parallel.

In the aforementioned structure, the first unidirectional conducting tube adopts a first triode, a base of the first triode is connected with the control circuit, an emitter of the first triode is grounded via the first resistor and the first capacitor which are connected in parallel, and a collector of the first triode is floating.

In the aforementioned structure, the NFC card emulation device further comprises:

an information interaction circuit connected with the control circuit and accomplishing information interaction between the NFC card emulation device and the card reader.

In the aforementioned structure, the button press confirmation circuit comprises:

a button, a second unidirectional conducting tube, a third resistor, and a second capacitor; and a first end of the second unidirectional conducting tube is connected to the control circuit, a second end of the second unidirectional conducting tube is grounded via the button and the second capacitor which are connected in parallel, and the third resistor is connected with the second unidirectional conducting tube in parallel.

In the aforementioned structure, the second unidirectional conducting tube adopts a first diode, an anode of the first diode is connected with the control circuit, and a cathode of the first diode is grounded via the button and the second capacitor which are connected in parallel.

In the aforementioned structure, the second unidirectional conducting tube adopts a second triode, a base of the second triode is connected with the control circuit, an emitter of the second triode is grounded via the button and the second capacitor which are connected in parallel, and a collector of the second triode is floating.

In the aforementioned structure, the control circuit comprises a control chip, a first input/output terminal of the control chip is connected with the first end of the second unidirectional conducting tube, a second input/output terminal of the control chip is connected with the first end of the first unidirectional conducting tube, and a third input/output terminal of the control chip is connected with the information interaction circuit.

In the present application, the NFC card emulation device comprises the button press confirmation circuit, the time-out determination unit, and the control circuit. The time-out determination unit is formed by adopting discrete components, such as, the second diode, the second resistor, the first resistor and the first capacitor, etc. When the NFC card emulation device approaches the card reader, the card reader supplies energy to the NFC card emulation device and charges the first capacitor by the control circuit, and when the NFC card emulation device is removed from the card reader, the control circuit realizes the timing function by the first capacitor; if, within the timing period, it is determined that the button press confirmation has been performed, it is determined that the button press confirmation is valid. Such a time-out determination unit has a simple structure and low cost.

DETAILED DESCRIPTION OF THE EMBODIMENTS

In order to make the purposes, technical solutions, and advantages of the present invention clearer and more understandable, the present invention will be further described in detail hereinafter with reference to the accompanying drawings and embodiments. It should be understood that the embodiments described herein are only intended to illustrate but not to limit the present application.

Figure 1:
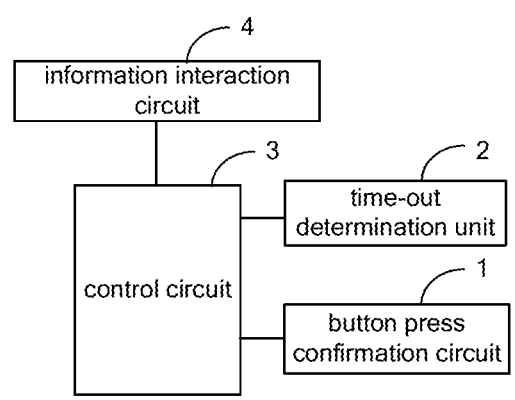
FIG. 1 is a structural diagram of an NFC card emulation device provided by embodiments of the present application.

FIG. 1 shows a structural diagram of an NFC card emulation device provided by embodiments of the present application, for facilitate the description, only parts related to the embodiments of the present application are shown.

An NFC card emulation device is provided and the NFC card emulation device comprises:

a button press confirmation circuit 1 configured to perform button press confirmation;

a time-out determination unit 2 configured for timing; and a control circuit 3 which is respectively connected with the button press confirmation circuit 1 and the time-out determination unit 2 and configured to determine whether the button press confirmation is performed within a timing period after the NFC card emulation device is removed from a card reader.

As one embodiment of the present application, the NFC card emulation device further comprises:

an information interaction circuit 4 connected with the control circuit 3 and accomplishing information interaction between the NFC card emulation device and the card reader.

Figure 2:
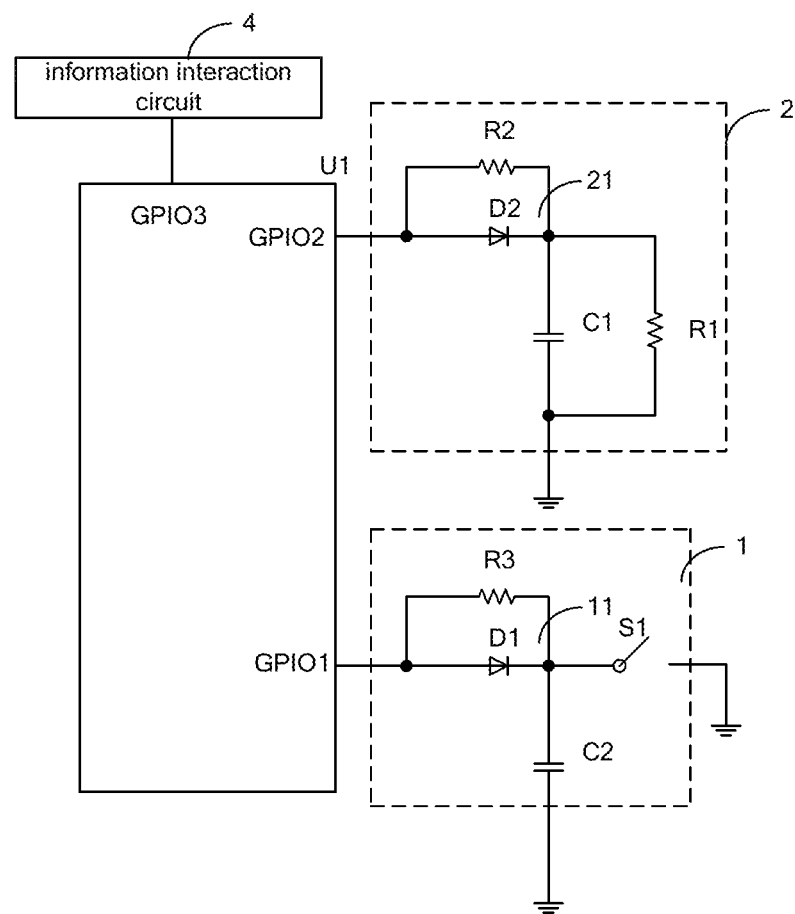
FIG. 2 is a structural circuit diagram of an NFC card emulation device provided by a first embodiment of the present application.

FIG. 2 illustrates the circuit structural diagram of the NFC card emulation device provided by a first embodiment of the present application, for facilitating the description, only parts related to the embodiments of the present application are shown.

The time-out determination unit 2 comprises:

a first unidirectional conducting tube 21, a second resistor R2, a first resistor R1, and a first capacitor C1;

a first end of the first unidirectional conducting, tube 21 is connected with the control circuit 3, a second end of the first unidirectional conducting tube 21 is grounded via the first resistor R1 and the first capacitor C1 which are connected in parallel, and the second resistor R2 and the first unidirectional conducting tube 21 are connected in parallel.

As one embodiment of the present application, the first unidirectional conducting tube 21 adopts a second diode D2. An anode of the second diode D2 is connected with the control circuit 3, a cathode of the second diode D2 is grounded via the first resistor R1 and the first capacitor C1 which are connected in parallel.

As one embodiment of the present application, the button press confirmation circuit 1 comprises:

a button S1, a second unidirectional conducting tube 11, a third resistor R3, and a second capacitor C2;

a first end of the second unidirectional conducting tube 11 is connected to the control circuit 3, a second end of the second unidirectional conducting tube 11 is grounded via the button S1 and the second capacitor C2 which are connected in parallel, and the third resistor R3 is connected with the second unidirectional conducting tube in parallel.

As one embodiment of the present application, the second unidirectional conducting tube adopts a first diode D1, an anode of the first diode D1 is connected with the control circuit 3, a cathode of the first diode D1 is grounded via the button S1 and the second capacitor C2 which are connected in parallel.

Figure 3:
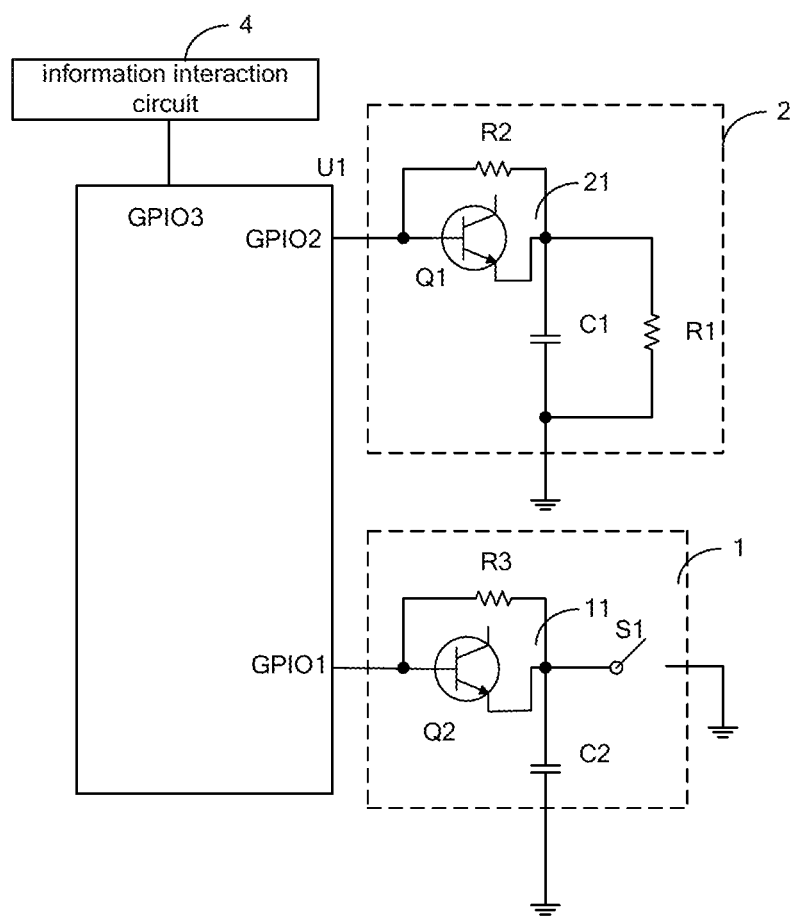
FIG. 3 is a structural circuit diagram of an NFC card emulation device provided by a second embodiment of the present application.

FIG. 3 shows a circuit structural diagram of the NFC card emulation device provided by a second embodiment, for facilitate the description, only parts related to the embodiments of the present application are shown.

As one embodiment of the present application, the first unidirectional conducting tube 21 adopts a first triode Q1, a base of the first triode Q1 is connected with the control circuit 3, an emitter of the first triode Q1 is grounded via the first resistor R1 and the first capacitor C1 which are connected in parallel, and a collector of the first triode Q1 is floating.

As one embodiment of the present application, the second unidirectional conducting tube 11 adopts a second triode Q2, a base of the second triode Q2 is connected with the control circuit 3, an emitter of the second triode Q2 is grounded via the button S1 and the second capacitor C2 which are connected in parallel, and a collector of the second triode Q2 is floating.

As one embodiment of the present application, the control circuit comprises a control chip U1, a first input/output terminal GPIO1 of the control chip U1 is connected with the first end of the second unidirectional conducting tube 11, a second input/output terminal GPIO2 of the control chip U1 is connected with the first end of the first unidirectional conducting tube 21, and a third input/output terminal GPIO3 of the control chip U1 is connected with the information interaction circuit 4.

Wherein, the control chip U1 can specifically adopts, for example, a THD86 chip, a THK88 chip, or an ACS chip, etc., chips of other types can also be utilized.

Working principle of the NFC card emulation device is as follows:

The control chip U1 performs information interaction between the NFC card emulation device and the card reader via the information interaction circuit 4, during which, a second input/output terminal GPIO2 of the control chip U1 is pulled to a VDDIO, and the first capacitor C1 starts to be charged; the first input/output terminal GPIO1 of the control chip U1 is pulled to the VDDIO, and the second capacitor C2 starts to be charged. After the information interaction between the NFC card emulation device and the card reader, the card reader is moved away from the NFC card emulation device, the first capacitor C1 is discharged via the second resistor R2 and the first resistor R1, and the second input/output terminal GPIO2 of the control chip U1 monitors a voltage of the first capacitor C1, because both a resistance of the second resistor R2 and an internal resistance of the second input/output terminal GPIO2 of the control chip UI are much greater than a resistance of the first resistor R1, a discharge time of the first capacitor C1 is mainly determined by the first resistor R1. According to discharge characteristics of resistance-capacitance (RC) circuits, time required for discharging the first capacitor C1 can be calculated according to T=2.2RC, and the time can be adjusted according to resistance values of the first capacitor C1 and the first, resistor R1.

FIG. 2 shows the structure of the button press confirmation circuit, it is required that the discharge time of the first capacitor C1 is shorter than the discharge time of the second capacitor C2, for example, when R3=R2, C2>C1, and the second capacitor C2 and the first capacitor C1 are mainly discharged through the third resistor R3 and the first resistor R1, thus, when the discharge of the second capacitor C2 is slower than the discharge of the first capacitor C1, an electric quantity of the second capacitor C2 is always higher than an electric quantity of the first capacitor C1. That is, when a voltage detected by the second input/output terminal GPIO2 is high, a voltage detected by the first input/output terminal GPIO1 must be high; and when the voltage detected by the second input/output terminal GPIO2 is just low, the voltage detected by the first input/output terminal GPIO1 is still high, in such condition, if the button S1 is still not pressed, it is determined by the control chip U1 that the confirmation of the button S1 is time-out, and thereafter it is invalid to press the button. In the condition that the time is not out and the button S1 is pressed, the second capacitor C2 will be quickly discharged to make the electric quantity be 0, and the voltage detected by the first input/output terminal GPIO1 is low, then the button pressing is valid.

In embodiments of the present application, the NFC card emulation device comprises the button press confirmation circuit, the time-out determination unit, and the control circuit. The time-out determination unit is formed by adopting discrete components, such as, the second diode D2, the second resistor R2, the first resistor R1 and the first capacitor C1, etc. When the NFC card emulation device approaches the card reader, the card reader supplies energy to the NFC card emulation device and charges the first capacitor C1 by the control circuit, and when the NFC card emulation device is removed from the card reader, the control circuit realizes the timing function by the first capacitor C1; if, within the timing period, it is determined that the button press confirmation has been performed, it is determined that the button press confirmation is valid. Such a time-out determination unit has a simple structure and low cost.

The aforementioned embodiments are only preferred embodiments of the present application, and are not intended to limit the present application. Any modification, equivalent replacement, improvement, and so on, which are made within the spirit and the principle of the present application, should be included in the protection scope of the present application.

What is claimed is:

1. A near field communication (NFC) card emulation device,
   wherein the NFC card emulation device comprises:
   a button press confirmation circuit configured to perform button press confirmation;
   a time-out determination unit configured for timing; and
   a control circuit which is respectively connected with the button press confirmation circuit and the time-out determination unit and configured to determine whether the button press confirmation is performed within a timing period after the NFC card emulation device is removed from a card reader;
   the time-out determination unit comprises: a first unidirectional conducting tube, a first resistor, a second resistor, and a first capacitor; and
   a first end of the first unidirectional conducting tube is connected with the control circuit, a second end of the first unidirectional conducting tube is grounded via the first resistor and the first capacitor which are connected in parallel, and the second resistor and the first unidirectional conducting tube are connected in parallel.

2. The device of claim 1, wherein the first unidirectional conducting tube adopts a second diode, an anode of the second diode is connected with the control circuit, and a cathode of the second diode is grounded via the first resistor and the first capacitor which are connected in parallel.

3. The device of claim 1, wherein the first unidirectional conducting tube adopts a first triode, a base of the first triode is connected with the control circuit, an emitter of the first triode is grounded via the first resistor and the first capacitor which are connected in parallel, and a collector of the first triode is floating.

4. The device of claim 1, further comprising:
   an information interaction circuit connected with the control circuit and accomplishing information interaction between the NFC card emulation device and the card reader.

5. The device of claim 1, wherein the button press confirmation circuit comprises:
   a button, a second unidirectional conducting tube, a third resistor, and a second capacitor; and
   a first end of the second unidirectional conducting tube is connected to the control circuit, a second end of the second unidirectional conducting tube is grounded via the button and the second capacitor which are connected in parallel, and the third resistor is connected with the second unidirectional conducting tube in parallel.

6. The device of claim 5, wherein the second unidirectional conducting tube adopts a first diode, an anode of the first diode is connected with the control circuit, and a cathode of the first diode is grounded via the button and the second capacitor which are connected in parallel.

7. The device of claim 5, wherein the second unidirectional conducting tube adopts a second triode, a base of the second triode is connected with the control circuit, an emitter of the second triode is grounded via the button and the second capacitor which are connected in parallel, and a collector of the second triode is floating.

8. The device of claim 5, wherein the control circuit comprises a control chip, a first input/output terminal of the control chip is connected with the first end of the second unidirectional conducting tube, a second input/output terminal of the control chip is connected with the first end of the first unidirectional conducting tube, and a third input/output terminal of the control chip is connected with the information interaction circuit.

* * * * *